June 3, 1969 F. R. JOHANSON 3,447,575

TOOL FOR ARRANGING A GROUP OF LEADS OF AN INTEGRATED CIRCUIT ELEMENT TO FACILITATE MOUNTING

Filed May 3, 1967

INVENTOR.
FREDERIC R. JOHANSON
BY
MAHONEY, MILLER & RAMBO
BY Wm. V. Miller
ATTORNEYS United States Patent Office 3,447,575

Patented June 3, 1969

3,447,575

TOOL FOR ARRANGING A GROUP OF LEADS OF AN INTEGRATED CIRCUIT ELEMENT TO FACILITATE MOUNTING

Frederic R. Johanson, Columbus, Ohio, assignor to The Jaeger Machine Company, Columbus, Ohio, a corporation of Ohio Filed May 3, 1967, Ser. No. 635,761
Int. Cl. B21f *1/00;* B21d *9/05*
U.S. Cl. 140—106 6 Claims

ABSTRACT OF THE DISCLOSURE

The present invention relates to a tool which is used for arranging the group of leads projecting from a circuit element, such as a transistor package, in a predetermined pattern of spaced leads corresponding to a pattern of spaced, lead-receiving holes in a support, such as a printed circuit board, in which the ends of the group of leads are to be inserted. In its specific form, the tool comprises a mandrel of frusto-conical form which is adapted to receive the group of leads, disposed in a substantially circular pattern, in radially opening notches disposed in a corresponding circular pattern at its smaller end, together with a forming collar which is to slip over these leads and bend them to the shape of the mandrel to arrange their extremities in a larger circle and which are spaced apart uniformly at increased spaced intervals.

*Brief description of drawing*

In the accompanying drawing, there is illustrated a preferred embodiment of this invention and in this drawing.

*Detailed description*

Figures 1, 2, 3, 4, 5, 6:
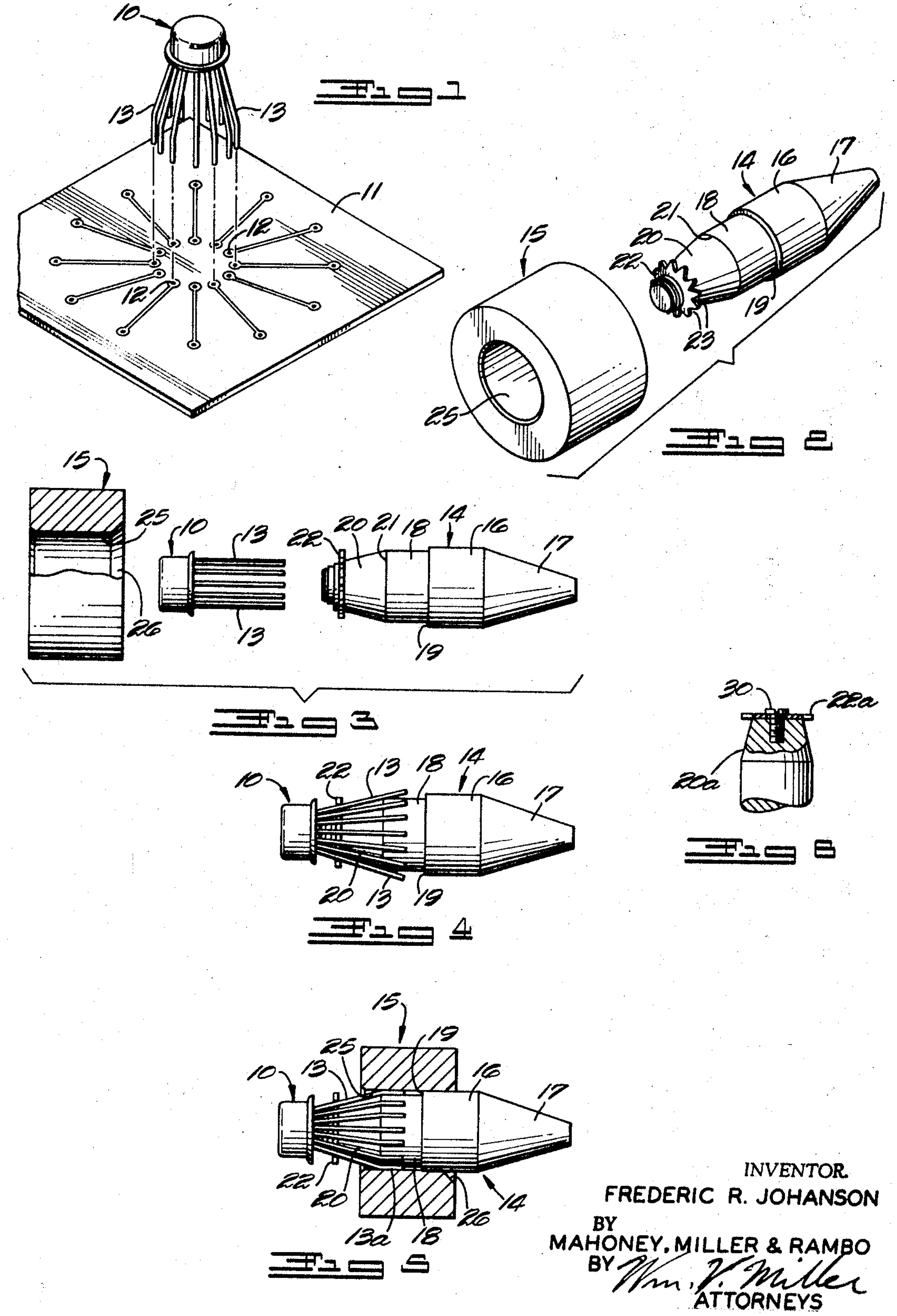
FIGURE 1 is an example of a circuit element with leads which have been arranged by the tool of this invention disposed over the holes in a printed circuit adapted to receive the ends of the leads.
FIGURE 2 is a perspective view showing the mandrel and forming collar of the tool in axially aligned spaced relationship.
FIGURE 3 is an elevational view, partly broken away, showing the circuit element to be operated upon by the tool between the axially spaced forming collar and mandrel.
FIGURE 4 is a side elevational view showing the positioning of the circuit element on the mandrel.
FIGURE 5 is a similar view but showing the forming collar in section moved on the mandrel to bend and rearrange the ends of the leads.
FIGURE 6 illustrates a modification of the mandrel and associated collar.

With reference to the drawing, as indicated in FIGURE 1, this invention deals with a circuit package or element indicated at 10 which is adapted to be mounted, for example, on a printed-circuit board indicated at 11. The printed-circuit board has the pattern of holes 12 for receiving the terminals or leads 13 of the circuit element which must be arranged in the same pattern. The circuit element is shown as comprising a housing of metal of substantially cylindrical form which has the leads 13 extending therefrom in a circular group which should be coaxial with the housing 10. As manufactured, the circuit element would appear as in FIGURE 3 with the leads 13 of the circular group extending straight and parallel with each other and arranged coaxially around the extension of the axis of the housing in angularly spaced positions which may or may not be uniform. To make the circuit element fit on the board 11, it is necessary to rearrange the leads so that they are spaced apart farther but uniformly to form a larger circular group corresponding to the group of receiving holes in the board 11. This is accomplished easily, inexpensively and quickly by the tool of this invention which is shown in detail in FIGURE 2 and the use of which is indicated in FIGURES 3–5.

The tool consists of two separate units, namely, a mandrel 14 and a separate forming collar 15 adapted to be slipped axially over the mandrel and to cooperate therewith in the lead arranging and forming operation. Both units are preferably formed of metal.

The mandrel 14 is provided with a cylindrical section 16 of greatest diameter. Projecting axially in the one direction from the cylindrical section 16 is a cylindrical section 18 of reduced diameter which provides a cylindrical surface with which the lead extremities are engaged to properly form them. The difference in diameter between the section 18 and the section 16 provides an annular shoulder 19 between the two cylindrical surfaces thereof which is of a radial extent slightly greater than the cross-sectional diameter of each lead 13. Projecting axially outwardly from the cylindrical section 18 is a frusto-conical section 20 which merges with the section 18 at the circular line 21. The outer pointed extremity of the section 20 has mounted thereon in a suitable manner a serrated and notched collar 22 which may be mounted thereon by shrink-fitting or in other suitable ways but the serrations or notches may also be provided in other ways as by notching the surface of the mandrel. It will be noted best in FIGURE 2 that this provides a plurality of outwardly-opening, V-shaped notches or lead-receiving sockets 23 spaced angularly in a uniform manner around the pointed outer end of the scetion 20 of the mandrel. These notches will correspond in number and spacing to the leads 13 and this may be varied. The diameter of the serrated collar will be greater than the diameter of the circular group of leads 13 to be received thereby but at the inner extremities of the notches 23 will be of a diameter less than that of the circular group. This is so that when the group of leads 13 is slipped over the end 20 of the mandrel, the leads will be received in the respective notches 23 of the collar 22.

The forming collar 15 adapted to cooperate with the mandrel 14 is of substantially cylindrical form having a coaxial cylindrical bore 25 extending completely therethrough. As indicated in FIGURE 3, the one end of this bore is enlarged or flared, as indicated at 26, to facilitate slipping of the collar axially onto the frusto-conical end 20 of the mandrel. However, the inner tubular surface of the bore is parallel to the axis of the collar throughout most of its length.

In FIGURE 6, a modification is shown in which the collar 22*a* is removably mounted on the end 20*a* of the mandrel so that it can be removed and be replaced with collars having various sizes and numbers of notches. In this form, a removable screw 30 normally holds the collar in position on the mandrel.

In using the tool, the circuit element 10, as received, may be positioned on the tool for rearranging the leads 13 thereof in a predetermined manner. If desired, the group of leads 13 may be positioned over the frusto-conical end 17 to bring about a slight bending or spreading of the leads and then may be slipped over the end 17, although in many instances they will be slipped only over the end 20 or 20*a.* As the group of leads 13 is slipped over the end 20, as shown in FIGURE 4, they will be received in and guided into the inner ends of the notches 23 which will simultaneously uniformly space them. Then the collar 15 will be slipped over the circuit element housing and onto the mandrel to the position shown in FIGURE 5. The flared end 26 of the bore 25 will facilitate axial movement of the collar onto the leads surrounding the mandrel which will at this time be flared outwardly as shown in FIGURE 4. It will be understood that the collar bore 25 will be of greater diameter than the circuit element housing and, in fact, will be slightly greater than the cylindrical section 16 of the mandrel, over which it will extend and be complemental to when it reaches the final position shown in FIGURE 5. As the collar passes axially over the spread leads 13, its inner cylindrical tubular surface will engage and bend the extremities 13*a* of the leads inwardly to form a different circular arrangement with the extremities 13*a* spaced apart uniformly but at greater distances than the original spacing of the straight leads 13. The extremities will be bent against and formed against the section 18 which is smaller than the section 16 to provide an annular space for the group of leads between the surface of the bore 25 and the cylindrical surface of the section 18 as shown in FIGURE 5. At this time, the leading part of the collar 15 will be guided by the cylindrical section 16. The collar 15 may be moved on axially over and off the section 16 and be removed from the mandrel to permit removal of the element 10.

Thus, the tool provides a mandrel with means for receiving and holding the leads of the group in a predetermined angularly spaced relationship with the leads spaced and flared from their original grouping, the mandrel being provided with a contour against which the spread leads are bent by a forming collar slipped axially onto the lead-supporting mandrel. The device is simple and inexpensive and can be used without difficulty.

Having thus described this invention, what is claimed is:

1. A tool for rearranging the leads of a circuit element which has the leads extending therefrom in a group of a predetermined substantially circular pattern of angularly spaced members comprising a mandrel with a leading forming end for insertion into the group having an exterior forming contour of substantially circular cross section, spacing means on the mandrel for receiving and positively spacing the leads of the group with a predetermined precise angular spacing, and a forming member adapted to be moved axially onto the mandrel to engage the leads and bend them radially inwardly to the contour of the mandrel, said spacing means comprising a notched formation on said end of the mandrel having radially outwardly opening notches which receive and accurately space said leads and said forming member comprises a collar having an annular opening extending axially therethrough to provide a lead-forming inner surface which cooperates with said lead-forming mandrel contour in engaging and forming the leads.

2. A tool according to claim 1 in which said end of the mandrel is of frusto-conical form with its smaller end outermost and said lead-spacing means comprises a serrated annular collar mounted coaxially on said end so that when the mandrel is inserted in the group of leads it will spread the respective leads outwardly but will space them accurately, said inner surface of said forming collar providing an annular tubular surface and said contour of the mandrel providing a first cylindrical guide surface which is radially spaced relative to said tubular surface to provide an annular lead-receiving space therebetween so that when the forming collar passes thereover the respective leads will be bent radially inwardly into contact with said first cylindrical guide surface.

3. A tool according to claim 2 including a cylindrical surface axially beyond said first cylindrical guide surface over which the collar slips and which is complemental to said tubular surface.

4. A tool according to claim 3 in which the adjacent end of said spacing collar opening is flared to facilitate slipping onto said leading end of the mandrel.

5. A tool according to claim 1 in which said notched formation is in the form of a separate annular collar mounted on said leading end of the mandrel.

6. A tool according to claim 5 in which fastening means is provided for removably mounting said collar on the mandrel.

References Cited

UNITED STATES PATENTS

| | | | |
|---|---|---|---|
| 2,061,759 | 11/1936 | Eitel et al. | 140—71.5 |
| 3,352,331 | 11/1967 | Swyt | 140—147 |

CHARLES W. LANHAM, *Primary Examiner.*

LOWELL A. LARSON, *Assistant Examiner.*

U.S. Cl. X.R.

72—391